(No Model.) 3 Sheets—Sheet 1.
W. COLLINS.
BUNDLE CARRIER FOR GRAIN BINDERS.
No. 298,449. Patented May 13, 1884.
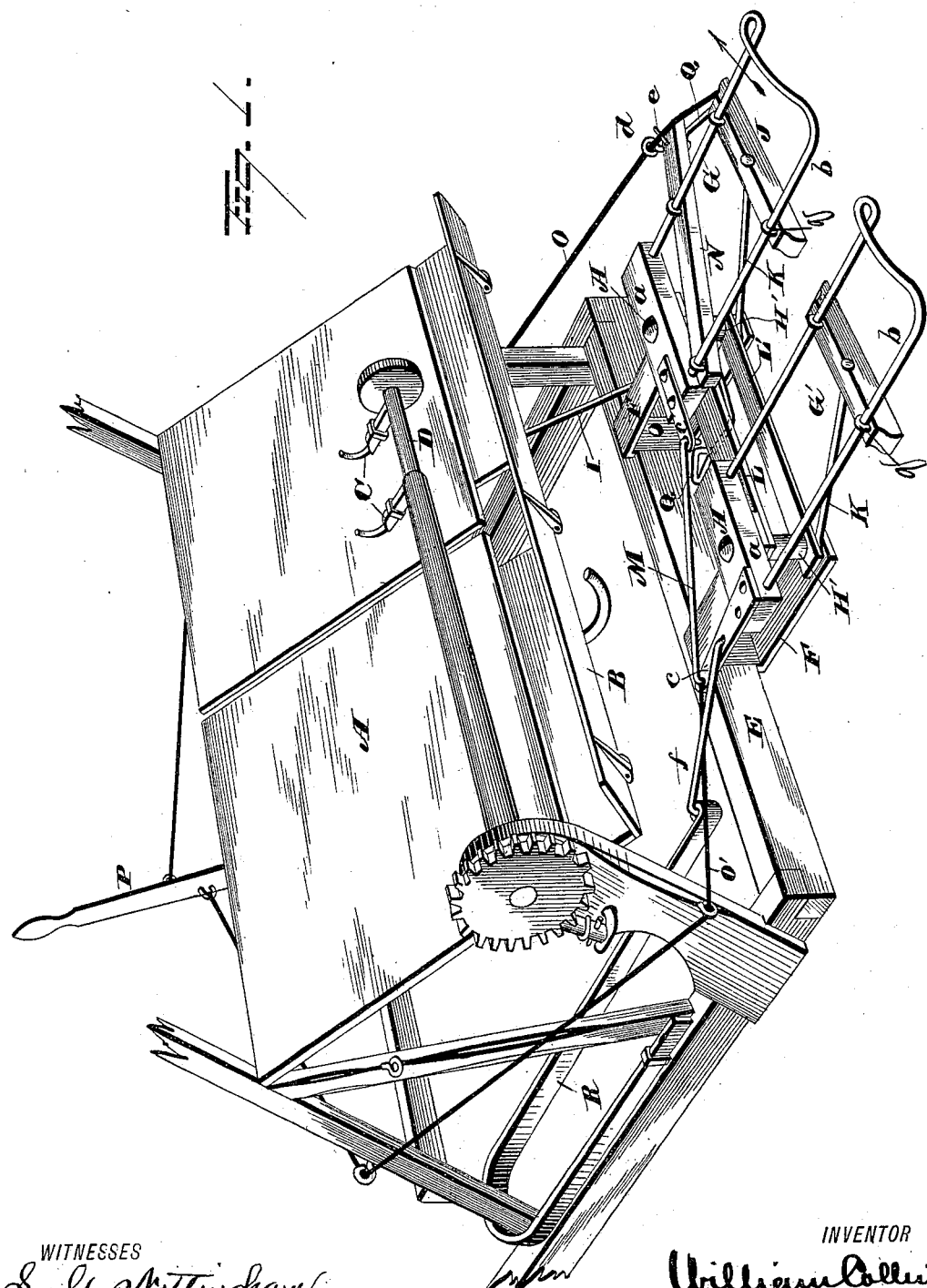
WITNESSES
S. J. Nottingham
George J. Downing
INVENTOR
William Collins
By Liggett & Liggett
Attorney

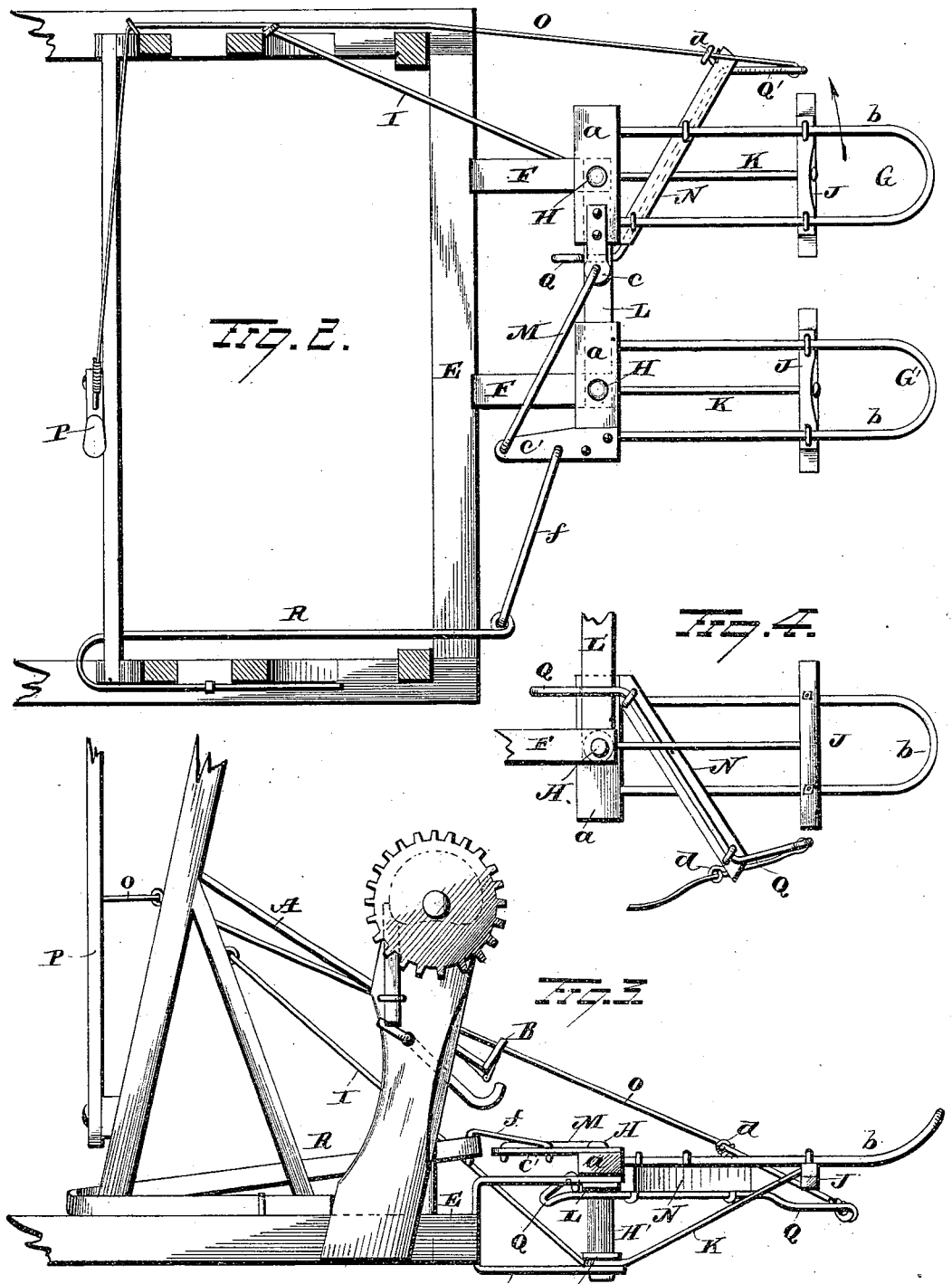

(No Model.) 3 Sheets—Sheet 3.
W. COLLINS.
BUNDLE CARRIER FOR GRAIN BINDERS.
No. 298,449. Patented May 13, 1884.
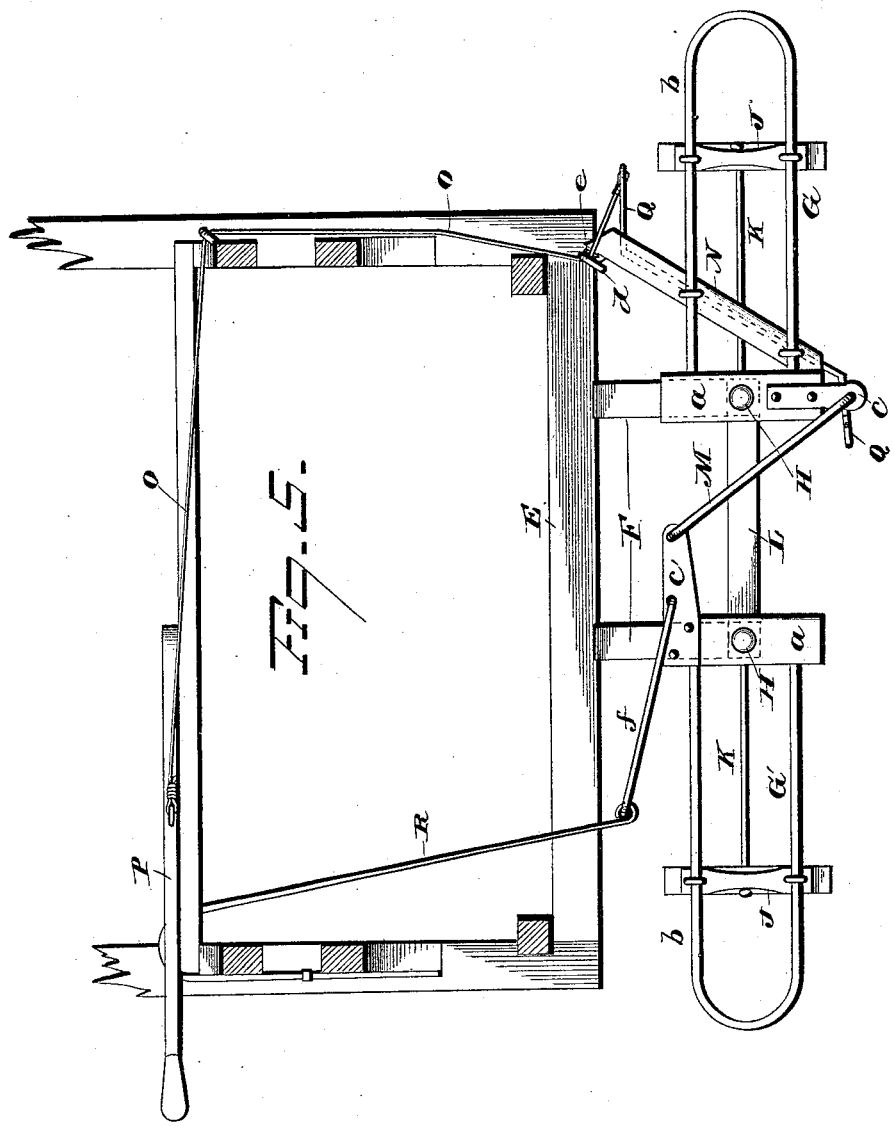
WITNESSES
S. G. Nottingham
George F. Downing
INVENTOR
William Collins.
By Leggett & Leggett
Attorney

UNITED STATES PATENT OFFICE.

WILLIAM COLLINS, OF PERHAM, MINNESOTA.

BUNDLE-CARRIER FOR GRAIN-BINDERS.

SPECIFICATION forming part of Letters Patent No. 298,449, dated May 13, 1884.

Application filed October 2, 1883. (No model.)

*To all whom it may concern:*

Be it known that I, WILLIAM COLLINS, of Perham, in the county of Otter Tail and State of Minnesota, have invented certain new and useful Improvements in Bundle-Carriers for Grain-Binders; and I do hereby declare the following to be a full, clear, and exact description of the invention, such as will enable others skilled in the art to which it appertains to make and use the same.

My invention relates to an improvement in bundle-carriers for grain-binding harvesters, the object of the same being to provide an attachment adapted to be secured to any grain-binder for the purpose of receiving the bound sheaves as they fall from the binder-table, and enabling a suitable number of them to be dropped simultaneously in rows, so that they can be readily shocked; and with these ends in view my invention consists in the parts and combinations of parts, as will be more fully described, and pointed out in the claims.

In the accompanying drawings, Figure 1 is a view in perspective showing my attachment applied to a grain-binder. Fig. 2 is a plan view of the same. Fig. 3 is a view in end elevation. Fig. 4 is a detached view showing the manner of locking the leaves in closed adjustment, and Fig. 5 is a view showing the leaves open.

A represents the machine binder-table, upon which the cut grain is deposited by endless aprons. This table is provided at its lower end with a gate, B, which latter holds the grain in position while being bound. This gate operates in conjunction with the tying mechanism, and as soon as the bundle is tied the gate drops and leaves the sheaf free to fall on the carrier.

C are delivery-arms secured to the shaft D, which latter is journaled above the binder-table. This shaft is so geared as to operate at the proper moment, and as soon as the bundle is tied the arms revolve and sweep the bundle from off the table onto the carriers. The gate is then automatically raised and holds the gavel in position to form the next bundle.

To the transverse beam E are secured the laterally-projecting brackets F, which latter support the leaves G G' and form the pivotal bearings therefor. These brackets are both situated in the same horizontal plane, and are provided at their other ends with openings for the passage of the bolts H, which latter secure the leaves thereto. The leaves preferably consist of a wooden head, *a*, provided with the U-shaped supports *b*, made of spring-steel wire, the ends of which are rigidly secured to the heads. The leaves thus formed rest horizontally in such positions as to receive the bundles as they fall from the table. The outer or curved ends of the U-shaped supports are preferably curved upward a sufficient distance to prevent the bundles from being crowded off or falling off while passing over rough ground. Instead of making these leaves of spring-wire, as before described, wooden arms or fingers can be substituted therefor, and answer all necessary purposes. These leaves are pivotally secured by the bolts H to the brackets F, and the parts are strengthened by the metallic brace-rods I, which latter are secured at their outer ends to the bolts H below the sleeve H', while their inner ends are secured to any convenient portion of the machine-frame. The curved arms or fingers of each leaf are connected together by the transverse braces J, and are supported and held in position by the brace-rods K, the lower ends of which are secured to the bolts H. The upper ends of these brace-rods are rigidly secured to the center of the transverse braces J, and the latter are adjustable on the curved supports, to enable any necessary inclination to be given to the said supports. By loosening the nuts on the lower ends of the clamping-bolts *q* the rods *b*, composing the leaves, are free to be moved through the eyes of the clamping-bolts. By thus loosening the bolts and elevating or depressing the outer ends of the leaves, and then tightening the bolts while in this elevated or depressed position, they are retained in such adjustment until the bolts are again loosened.

The two bolts supporting the two leaves are connected together by the beams L L', which latter hold the parts in the same relative position, and the one, L, as will be hereinafter described, coacts with a latch for holding the leaves in closed position. The head of the leaf G is provided with the rearwardly-extending arm *c*, while the head *a* of the leaf G' is provided with an inwardly-extending arm, *c'*. The outer extremities of these arms *c* and $c'$ are perforated and connected together by the rod M, which latter causes both leaves to operate simultaneously. Suppose, for the sake of illustration, that the front leaf, G, is turned on its pivot in the direction indicated by the arrow. Then the rod M, which connects the two leaves, would turn the other leaf in the opposite direction, and consequently cause the bundles supported on the leaves to drop down between them. The front leaf, G, is provided with the brace N, which preferably runs in the direction shown in the drawings. This brace is provided near its outer end with the eye $d$, through which the operating rope or chain O passes. The inner end of this rope is secured to the operating-lever P, while the outer end thereof is secured to the bent end of the lever Q. This lever Q is journaled to the under side of the brace N, and the inner end thereof is bent upwardly, or formed with a latch, so as to engage the upper beam, L, and prevent the leaves from accidentally opening. The inner end of the brace N also abuts against the upper beam, L, and limits the inward movement of the leaves. The operating cord or rope O is preferably provided with a stop, $e$, which latter, when the rope is drawn taut, is moved against the eye $d$, and takes the strain from the lever Q. When the cord is first drawn taut by moving the hand-lever, the power is all applied to the lever Q, and the latter is turned, so as to disengage the inner end thereof from the beam L. This unlocks the leaves G and G', and the latter are then free to be opened, and by continuing the movement of the hand-lever the power is applied to the eye $d$ by means of the stop $e$, and the leaves are opened.

To the inner or free end of the arm $c'$ the rope or chain O' is secured. This rope passes around or through the machine, and is attached at its opposite side to the hand-lever, so that by simply moving the hand-lever forwardly the leaves are closed.

If desired, a spring, R, can be secured to the machine in a suitable position, and be secured to the rearwardly-extending arm $c'$ of the leaf G' by the rod $f$. The tendency of this spring is to constantly close the leaves, and when this is employed the rope O' can be dispensed with. The carriers are so situated as to receive the bundles as they fall from the binder-table, and as the first bundle falls onto the leaves it rests close up to the heads $a$. The second bundle falls onto the first and moves it slightly toward the outer ends of the leaves, and so on until the leaves are filled, or a sufficient number have been deposited thereon, when the hand-lever is turned by the driver, who sits in close proximity thereto. This movement of the hand-lever causes the leaves to separate and move from under the bundles, and the latter drop onto the ground. This complete attachment is rigidly secured to the bundle-frame, and hence the leaves are always sufficiently elevated to prevent their striking the ground. As soon as the bundles are dropped by the carrier, the leaves are either brought together and locked by moving the hand-lever or by the spring before referred to.

It is obvious that the leaves can be formed in numerous ways, and operated by a series of levers instead of the ropes heretofore described, and that the whole attachment can be secured to the machine-frame by other means than those shown and described, and hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. The combination, with a grain-binding harvester, of two horizontally-movable leaves hinged thereto, means for opening and closing the leaves, and a rod or other device connecting the leaves, whereby they are moved simultaneously and in opposite directions, substantially as set forth.

2. The combination, with a grain-binding harvester, of two horizontally-movable leaves hinged thereto, devices for locking the leaves in closed adjustment, and mechanism whereby they are moved simultaneously in opposite directions.

3. The combination, with a grain-binding harvester, of two horizontally-movable leaves pivotally secured to the machine-frame, each leaf consisting, essentially, of a head, $a$, and U-shaped frame, said frames being turned up at their outer ends, and devices connecting the leaves, whereby they are moved simultaneously and in opposite directions.

4. The combination, with a grain-binding harvester, of two horizontally-movable leaves pivotally secured to the machine-frame, the brace-rods K, and braces J, all of the above parts combined as described.

5. The combination, with two leaves pivotally secured to a binder-frame, and adapted to be moved simultaneously in opposite directions, of a locking-lever journaled to one of the leaves for the purpose of locking both leaves in a closed position, and adapted to be operated by the driver, substantially as set forth.

6. The combination, with a grain-binding machine, of the two leaves, one of which is provided with a diagonal brace, N, devices for connecting the two leaves, whereby they are moved simultaneously in opposite directions, the locking-lever, and devices for opening and closing the leaves, substantially as set forth.

In testimony whereof I have signed this specification in the presence of two subscribing witnesses.

WILLIAM COLLINS.

Witnesses:
E. ROTHWELL,
S. G. NOTTINGHAM.